United States Patent [19]

Shibata

[11] 3,933,486

[45] Jan. 20, 1976

[54] SILVER-METAL OXIDE COMPOSITE AND METHOD OF MANUFACTURING THE SAME

[75] Inventor: Akira Shibata, Yokohama, Japan

[73] Assignee: Chugai Denki Kogyo Kabushiki-Kaisha, Tokyo, Japan

[22] Filed: May 30, 1974

[21] Appl. No.: 474,704

[30] Foreign Application Priority Data

Feb. 12, 1974 Japan ................................ 49-16226
Feb. 12, 1974 Japan ................................ 49-16227

[52] U.S. Cl. ................................................ 75/173 A
[51] Int. Cl.² .......................................... B32B 15/00
[58] Field of Search ................................... 75/173 A

[56] References Cited

UNITED STATES PATENTS

| | | | |
|---|---|---|---|
| 2,200,855 | 5/1940 | Ruben | 75/173 A X |
| 2,486,341 | 10/1949 | Stumbock | 75/173 A X |
| 2,496,555 | 2/1950 | Matthias et al. | 75/173 A X |
| 2,861,155 | 11/1958 | Farnham et al. | 75/173 A X |
| 3,323,911 | 6/1967 | Inoue | 75/173 A X |

FOREIGN PATENTS OR APPLICATIONS

| | | | |
|---|---|---|---|
| 1,153,178 | 8/1963 | Germany | 75/173 A |
| 2,011,002 | 9/1971 | Germany | 75/173 A |

*Primary Examiner*—L. DeWayne Rutledge
*Assistant Examiner*—E. L. Weise
*Attorney, Agent, or Firm*—Shlesinger, Fitzsimmons & Shlesinger

[57] ABSTRACT

An electrical contact material obtained through internally oxidizing a silver alloy which is the solid solution with 5 to 20 weight percent of one or more of the solute metal elements selected from tin, zinc and antimony and which contains 0.01 to 1.0% weight percent of bismuth. The silver alloy may also include up to 0.5 weight percent of ferrous metal or metals.

3 Claims, No Drawings

SILVER-METAL OXIDE COMPOSITE AND METHOD OF MANUFACTURING THE SAME

This invention relates to the preparation of composite material used for the manufacture of electrical contacts and consisting essentially of silver base and the oxides of other solute metal elements, and it relates to said composite material.

Considerable difficulties were hitherto encountered in the preparation of compound contact material through the way of internal oxidation of silver alloy containing more than 5 weight percent of tin, zinc or antimony.

The mechanism of the internal oxidation in general may be explained by such that the solute metal elements are diffused concentratedly about the centers or nuclei of oxidation and continue to grow as oxide particles so that the alloy base is converted into pure silver in the course of growth of the oxide particles for providing the sufficient route for the oxygen diffusion. In the case of the Ag-Sn, Ag-Sb and Ag-Zn alloys, when the molten ingot of these alloys is rolled into a plate and subjected to oxidation, the diffusion coefficient of the solute metals is higher in the direction parallel to the plate surface than that in the direction normal to the plate surface, that is, the diffusion of the solute metals in a direction normal to the plate surface tends to be retarded. Under such situation, the oxide films are heaped locally one on the other adjacent to the plate surface, and finally the progress of internal oxidation may be terminated at an early stage. For example, in the case that an ingot of Ag-Sn alloy is dissolved and rolled into a plate for subsequent oxidation, the growth of the precipitated oxidized particles is reduced with increase in the contents of tin in the silver alloy, and the resulting crystalline particles are lessened in size. Thus, the route of oxygen diffusion is reduced to zero, with the result that the oxidized films are heaped locally to impede a further progress of the internal oxidation. This anisotropy observed in the diffusion of the solute metals through the silver matrix is increased with increase in the alloy metal concentration in the silver base. For this reason, it has been considered a matter of great difficulty to manufacture the contact material of the silver alloy of the above type containing as much as 13 to 15 weight percent of solute metal element, as in the case of Ag-CdO contact material which is widely used nowadays for the industrial purpose.

For selective oxidation of the silver alloy of the above type which can be subjected to the internal oxidation only with considerable difficulty as described above, the non-crystalline solute metal elements must be precipitated in the vicinity of the grain boundaries in the form of oxides with as large specific surface as possible while preventing the growth of silver crystalline grains and making the size of the crystal grains small, so as to provide the imbricate oxidized structure in its cross-section.

In general, oxygen gas is diffused through the silver crystalline grains and the boundaries of the grains. The speed of oxygen diffusion in the vicinity of the boundaries is larger than that through the crystalline grains, and the oxides tend to be precipitated in the boundaries of the silver crystalline grains in the course of oxidation as a result of reduced diffusion potential in the crystal grains. In other words, the oxidation proceeds selectively about the boundaries of the crystal grains. According to the present invention, therefore, it is now proposed to add a trace amount of bismuth capable of forming a solid solution with silver in a higher temperature but hardly capable of forming the solid solution in ambient temperature with the view to making the crystal grains resultant from the forging and rolling of the silver alloy small in size and realizing the internal oxidation of the silver alloy containing a rather large amount of solute metal elements.

The element bismuth forms a solid solution at a higher temperature with silver and tin, which is used as solute metal, but is incapable of forming such solid solution in an ambient temperature. When added to the silver alloy used in the process of the present invention, the element bismuth behaves so as to impede the growth of silver crystalline grains and promote the diffusion of the solute metals in the boundaries of the crystal grains rather than through the crystal grains. Thus, when the alloy is subjected to the internal oxidation, thin oxide imbricate films are formed in the boundaries of the crystal grains in a way not to adversely affect the conductivity of the resulting contact material, which may thus be endowed with a selectively oxidized structure.

The average diameter of the silver crystalline grains of the crystal structure of the resulting composite alloy material was less than 50 $\mu$, while the thin films consisting of precipitated oxides of solute metals were observed in the boundaries of the crystal grains. It was also realized that less than 0.5 percent of ferrous metals could be desirably added for preventing the cracks from forming at the time of internal oxidation as a result of the increased rate of solute metal elements in the silver alloy.

This invention will now be described below by referring to the following numerical examples.

EXAMPLE 1

An alloy consisting of 8.5 weight percent of tin, 0.1 weight percent of bismuth and the balance of silver was produced and subjected to forging and rolling for forming a plate, which was then subjected to internal oxidation at a temperature of 650°C under an oxidizing atmosphere. The material for electrical contacts thus obtained has the following characteristics:

Hardness: HRF 90
Conductivity: IACS 70
Specific gravity: 10.05 g/cm$^3$

EXAMPLE 2

An alloy consisting of 6 weight percent of antimony, 3 weight percent of tin, 0.1 weight percent of bismuth and the balance of silver was produced and subjected to forging and rolling to form a plate 2 mm thick. The plate thus obtained was subjected to internal oxidation for 72 hours at a temperature of 650°C in an oxidizing atmosphere. The compound alloy material for electrical contacts thus obtained had the following characteristics:

Hardness: HRF 95
Conductivity: IACS 65
Specific gravity: 10.02 g/cm$^3$

EXAMPLE 3

An alloy consisting of 1.0 weight percent of zinc, 8 weight percent of tin, 0.1 weight percent of bismuth and the balance of silver was produced and subjected to forging and rolling into a plate 2 mm thick, and the plate thus obtained was subjected to internal oxidation for 72 hours at a temperature of 650°C in an oxidizing atmosphere. The compound alloy material for electrical contacts thus obtained has the following characteristics:

Hardness: HRF 93
Conductivity: IACS 67
Specific gravity: 10.01 g/cm$^3$

A comparative test was conducted with the alloys obtained in the way as described in the above examples, and with the conventional Ag-Cd alloys obtained by the method of internal oxidation on such properties as antiweldability and the rate of consumption as prescribed in A.S.T.M. The result of the test is tabulated in the Tables 1 and 2.

1.

Test on antiweldability.

Test conditions were as follows:

Voltage D.C. 240 V
Initial current: 7,000 A
Contact pressure: 200 g

The number of occurrence of welding as given in the following Table 1 is a mean value obtained by 20 times of measurements for each five sets of samples.

Table 1

| Material | Number of welding occurrence |
|---|---|
| 1. Ag-Cd 15% | 10 |
| 2. Ag-Sn 8.5%-Bi 0.1% | 0 |
| 3. Ag-Sb 6%-Sn 3%-Bi 0.1% | 1 |
| 4. Ag-Zn 1.0%-Sn 8%-Bi 0.1% | 0 |

The test samples 2, 3, 4 are the materials obtained in accordance with the present invention by internally oxidizing the alloys of the above composition. The test samples were 6 mm in outside diameter and 2 mm in thickness.

2.

Consumption as measured in the test prescribed in A.S.T.M.

Test conditions were as follows:

Voltage D.C. 200 V
Current: 50 A
Contact pressure: 400 g
Opening pressure: 600 g
Frequency: 70 times per minute Number of switching: 50,000

Average rate of consumption was measured for the same five sets of test samples as used in the antiweldability test.

TABLE 2

| Material | Consumption (in mg) |
|---|---|
| 1. Ag-Cd 15% | 22 |
| 2. Ag-Sn 8.5%-Bi 0.1% | 20 |
| 3. Ag-Sb 6%-Sn 3%-Bi 0.1% | 24 |
| 4. Ag-Zn 1.0%-Sn 8%-Bi 0.1% | 18 |

As obvious from the above results, the material obtained in accordance with the present invention is approximately similar in the rate of consumption and superior in antiweldability to the conventional Ag-CdO material. Though in the above examples moderate amounts of solute metal elements and bismuth were employed in silver alloys, it was confirmed that the alloys of this invention could contain 5 to 20 weight percent of tin, zinc or antimony or combination thereof and 0.01 to 1.0 weight percent of bismuth, not adversely affecting their physical properties as given above.

It was also realized that less than 0.5 percent of ferrous metals could be desirably added for preventing the cracks from forming at the time of internal oxidation as a result of the increase in the ratio of solute metals to the silver base.

What is claimed is:

1. An electrical contact material obtained by internally oxidizing an alloy of silver and solute metal elements, said alloy comprising a silver matrix, 5 to 20 weight percent of one or more of solute metal elements selected from the group consisting of tin, zinc, and antimony, and as an essential material, 0.01 to 1.0 weight percent of bismuth precipitated in the alloy as oxides.

2. The material as claimed in claim 1 wherein the maximum diameter of the grain boundaries of the silver matrix is less than 50 $\mu$, and thin films of the oxides of tin, zinc or antimony and of the oxides of bismuth are precipitated in said grain boundaries.

3. The material as claimed in claim 1 further containing less than 0.5 weight percent of ferrous metals.

* * * * *